United States Patent [19]
Baskis

[11] Patent Number: 5,269,947
[45] Date of Patent: Dec. 14, 1993

[54] THERMAL DEPOLYMERIZING REFORMING PROCESS AND APPARATUS

[76] Inventor: Paul T. Baskis, 1710 W. Fletcher, Chicago, Ill. 60657

[21] Appl. No.: 946,939

[22] Filed: Sep. 17, 1992

[51] Int. Cl.$^5$ ............................................. B01D 35/18
[52] U.S. Cl. ..................... 210/774; 210/806; 210/180; 210/181; 201/2.5; 585/240; 48/209; 95/266
[58] Field of Search ............... 210/774, 773, 180, 181, 210/182, 806, 770, 776, 769, 708; 55/50, 55; 201/2.5, 17; 48/209; 423/415 R; 44/388; 585/240

[56] References Cited

U.S. PATENT DOCUMENTS

| | | | |
|---|---|---|---|
| 3,956,126 | 5/1976 | Streebin et al. | 210/180 |
| 4,013,516 | 3/1977 | Greenfield et al. | 201/2.5 |
| 4,108,730 | 8/1978 | Chen et al. | 201/2.5 |
| 4,118,281 | 10/1978 | Yan | 201/2.5 |
| 4,175,211 | 11/1979 | Chen et al. | 201/2.5 |
| 4,280,817 | 7/1981 | Chauhan et al. | 201/17 |
| 4,636,318 | 1/1987 | Baker | 210/776 |
| 4,842,728 | 6/1989 | Baker | 210/180 |
| 4,897,205 | 1/1990 | Landry | 210/773 |
| 4,923,604 | 5/1990 | Baker | 210/180 |
| 4,981,579 | 1/1991 | Paspek et al. | 210/806 |

Primary Examiner—Robert A. Dawson
Assistant Examiner—Ana M. Fortuna
Attorney, Agent, or Firm—Wallenstein Wagner & Hattis, Ltd.

[57] ABSTRACT

This disclosure relates to a processor comprising means for mixing a process material with a process liquid (such as water) and forming an emulsion or slurry. Means is provided for pressuring and heating the slurry, and the slurry is then fed to means for quickly reducing the pressure to a relatively low value and further increasing the temperature. The rapid drop in pressure and increase in temperature causes volatile components of the slurry to convert to a gas and separate from the remainder of the slurry which is removed from the processor in the form of solids. The gas is fed to one or more condensers which separate the gas into useful liquids such as various grades of oil.

12 Claims, 1 Drawing Sheet

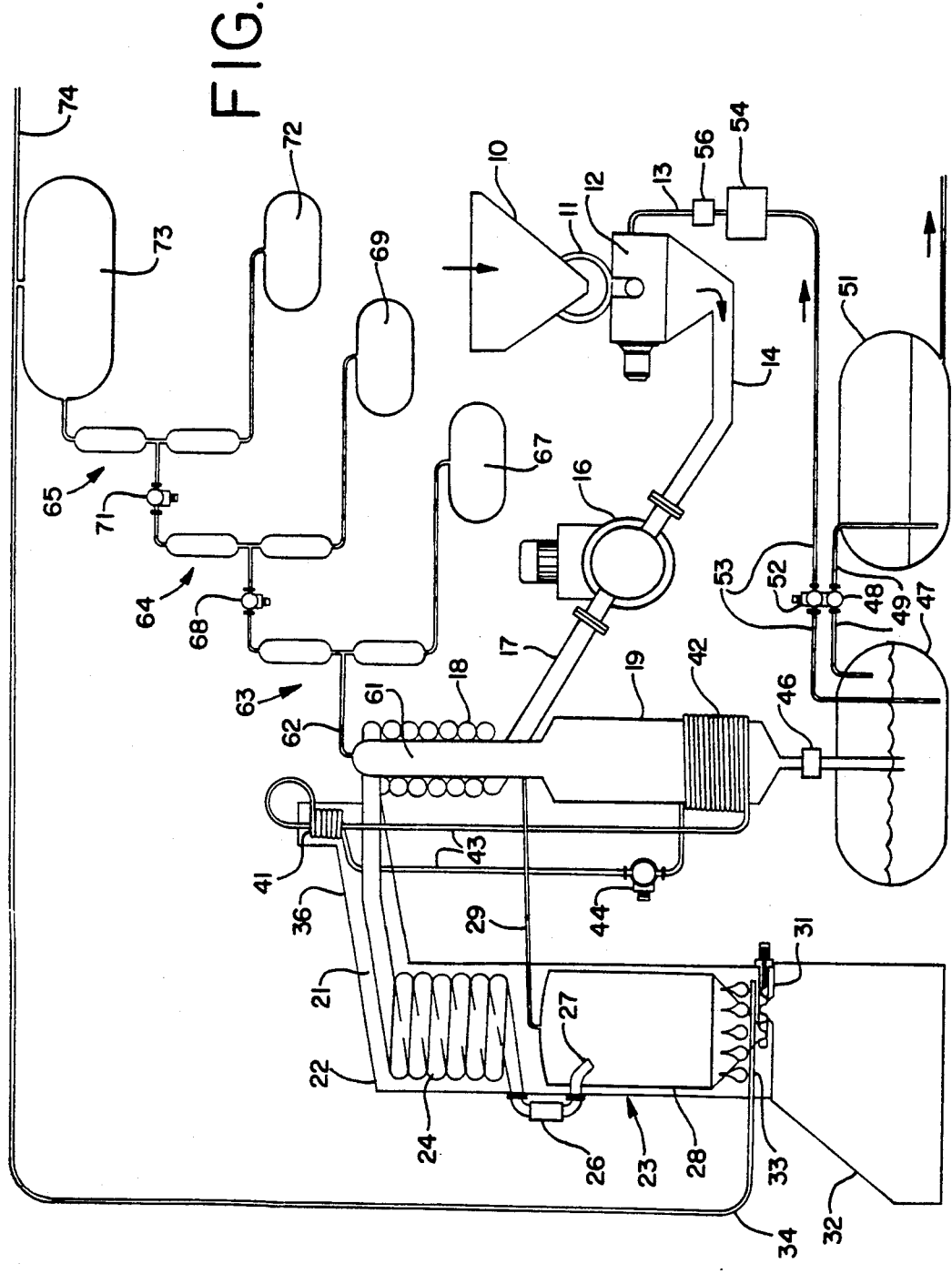

THERMAL DEPOLYMERIZING REFORMING PROCESS AND APPARATUS

FIELD AND BACKGROUND OF THE INVENTION

This invention relates generally to a chemical reforming apparatus and process, and more particularly to a thermal depolymerization processor for converting organic and/or inorganic materials into different more usable products.

Numerous systems have been proposed in the past for converting waste materials into useful products. For example, the following listed U.S. patents describe systems which purport to convert organic waste materials into useful products such as oil and gas:

| NUMBER    | PATENTEE   | DATE     |
|-----------|------------|----------|
| 4,108,730 | CHEN et al.| 08-22-78 |
| 4,175,211 | CHEN et al.| 11-20-79 |
| 4,118,281 | YAN        | 10-03-78 |
| 4,935,038 | WOLF       | 06-19-90 |
| 4,636,318 | BAKER      | 01-13-87 |
| 4,842,692 | BAKER      | 06-27-89 |
| 4,842,728 | BAKER      | 06-27-89 |
| 4,923,604 | BAKER      | 05-08-90 |

Further, the Shimizu U.S. Pat. No. 4,203,838 describes a system for processing sludge, and the Ohsol U.S. Pat. No. 4,938,876 describes a system for separating oil, gas and solids.

It is a general object of the present invention to provide an improved process for converting a process material such as organic materials (coal and/or organic waste) and inorganic materials into useful oils, gas and solids.

SUMMARY OF THE INVENTION

Generally, a processor in accordance with this invention comprises means for mixing a process material with a process liquid (such as water) and forming an emulsion or slurry. Means is provided for pressuring and heating the slurry, and the slurry is then fed to means for quickly reducing the pressure to a relatively low value and further increasing the temperature. The rapid drop in pressure and increase in temperature causes volatile components of the slurry to convert to a gas and separate from the remainder of the slurry which is removed from the processor in the form of solids. The gas is fed to one or more condensers which separate the gas into useful liquids such as various grades of oil.

BRIEF DESCRIPTION OF THE FIGURE

The invention will be better understood from the following detailed description taken in conjunction with the single figure of the drawing, wherein:

FIG. 1 is a diagram illustrating a processor constructed in accordance with a preferred form of this invention.

DETAILED DESCRIPTION OF THE INVENTION

While a processor constructed in accordance with this invention may be used to process a variety of organic and inorganic materials, the following description relates to a specific example wherein the material being processed (the process material) is coal and the liquid (the process liquid) mixed with the process material is water.

Small pieces of process material (anthracite coal nuggets in this specific example) are loaded into a hopper 10 which feeds the coal into a grinder 11. In a continuous flow system, a steady flow of coal would go into the hopper whereas in a batch system discrete quantities of coal would be introduced. The ground up pieces of coal move to an emulsifier 12 that mixes the coal with water and forms a coal-water emulsion. The amount of water may be approximately 50 to 100% (mass to mass) of the coal. The water is fed into the emulsifier through a tube 13 which receives recycled water as will be described hereinafter. The emulsion leaves through a flow conduit or pipe 14 connected to the intake of a high pressure pump 16 that discharges the mixture through a pipe 17 connected to the coils 18 of a heat exchanger. The coils 18 receive heat from a main condenser column 19 to be described further hereinafter, and the emulsion is further heated by flowing through a pipe 21 mounted in the enclosure 22 of the heating unit 23. The pipe 21 includes a heat exchanger coil 24 mounted in the upper portion of the enclosure 22.

The portion of the processor including the outlet of the pump 16, the pipe 17, the coil 18, the pipe 21 and the coil 24 may be referred to as the low-temperature-high-pressure (LTHP) portion of the system. At the emulsifier 12, the coal and the water may be at essentially ambient pressure and temperature, whereas in the coil 24 the temperature and the pressure may be increased to approximately 250° C. and 500 to 700 psi (relative pressure). The pressure in the LTHP portion is a function of the temperature and the volume of the pipe 21, and in this portion the coal becomes hydrated or saturated with water. The rate of flow of the emulsion and the length of the tube should be adjusted so that there is about a twenty minute dwell time in the high pressure part of the processor, to allow sufficient time for the reaction under high pressure. The high pressure keeps volatile components dissolved and in the solution. The operating parameters of temperature, pressure, the flow of velocity and the dwell time must be balanced to produce the above dwell time and pressure and to keep the particles in suspension.

The outlet of the coil 24 is connected to a valve 26 that acts as a differential pressure regulator. The outlet 27 of the valve 36 opens into an expansion container 28 wherein the pressure is reduced almost instantly to between approximately 0 and 200 psi (relative pressure). The incoming material is also quickly heated to approximately 350° to 500° C. A portion of the system including the container 28 may be referred to as the high-temperature-low-pressure (HTLP) portion of the processor. The sudden drop in the pressure combined with the sharp increase in temperature causes the slurry to separate into solids and volatile gas. The gas leaves the container through an outlet pipe 29 connected to the upper end of the container 28 and the solids fall to the bottom of the container 28 where they are removed by, for example, an auger 31. In the case where coal is fed into the processor, coke is removed and temporarily stored in a lower bin 32.

The container 28 of the HTLP portion is heated by a gas burner 33 mounted around the bottom of the container 28 within the enclosure 22. A tube 34 receives a gas product of the processor and feeds it to the burner 33. The container 28 and the burner 33 are mounted in the enclosure 22 along with the coil 24 and the pipe 21, and consequently the burning gas heats these components. The burner exhaust is discharged through a chimney portion 36 of the enclosure 22, the pipe 21 extending through the chimney portion to make maximum utilization of the heat.

The gas in the outlet pipe 29 is fed to the interior of the previously mentioned main condenser column 19 where the pressure and the temperature are regulated to cause water and oil to condense and separate from the volatile components which remain in a gaseous state. Regulation is accomplished by a heat exchanger including a first coil 41 mounted within the chimney portion 36 of the enclosure 22, and a second coil 42 which encircles the condenser column 19. Pipes 43 connect the two coils 41 and 42 and a regulator pump 44 circulates a heat exchange fluid (such as oil) through the coils to transfer heat from the chimney portion 36 to the column 19 as needed.

The oil and the water move downwardly through a trap 46 to a reservoir 47 where they naturally separate due to their different weights. A first pump 48 and tubes 49 remove the oil to a storage tank 51. A second pump 5 and tubes 53 remove the water and pass it through a sulfur removal unit 54 and a control valve 56 to the emulsifier 12, thereby recycling the water.

The relatively hot volatile gas moves upwardly through an upper portion 61 of the main or primary condenser column 19, the heat exchanger coil 18 extending around the upper portion 61 so that the slurry in the LTHP part of the system is heated by the gas leaving the column 19. Connected to the upper end of the main condenser column 19 is a pipe 62 which feeds the hot volatile gas to a series of secondary condenser columns 63, 64 and 65. The gas gradually decreases in temperature and increases in pressure as it moves through the secondary columns, and the pressure and temperature determine the condensate drawn off in each condenser stage. In this specific example, the gas is at about atmospheric pressure and 180° C. entering the first stage 63 and kerosine is produced and drawn off to a tank 67. A condenser pump 68 connects the two stages 63 and 64 and gas enters the stage 64 at about atmospheric pressure and 110° C., and toluene is drawn off and fed to a tank 69. Another pump 71 connects the stages 64 and 65 and the gas enters the stage 65 at atmospheric pressure and 30° C., and gasoline is drawn off to a tank 72.

Any remaining gas is fed to a storage tank 73 from the last condenser stage 65, and the previously mentioned tube or pipe 34 is connected to receive gas from the tank 73 for operating the burner 33. Another tube 74 is connected to the tube 34 and the storage tank 73 and is connected to receive a combustible gas from a commercial source (not illustrated). By this arrangement, the processor may be started in operation utilizing gas from the commercial source. Once the processor is running and producing gas, the tube 74 to the commercial source may be turned off and the burner 33 operated by gas produced by the processor. Of course, if the processor produces more gas than can be utilized to power the processor, the surplus gas may be drawn off and sold commercially.

Thus, the system receives coal and, without producing pollution, converts the coal into a number of valuable products. The coke in the bin 32 is a valuable source of low pollution heat; the quality and purity of the coke is a function of the temperature in the heating unit 23, the purest coke being produced at the high temperature of about 500° C. The sulfur removed by the unit 54 may also have commercial value, and the oil in the container 51 may find use as, for example, heating oil.

After the HTLP unit the coal slurry is chemically reformed and no longer has the physical attributes of the original coal. The pressure in the HTLP unit or container 28 determines the type of liquid-gas products produced in the main and secondary condenser columns. For example, a low pressure (about 0 psi relative) produces light oils rich in aromatic hydrocarbons; higher pressures (about 200 psi relative) produces heavier oils richer in asphaltenes. Because volatilization is the result of heat gain in the unit 23, the majority of the heat is contained in the volatile gas which flows to the main condenser coil, and part of the heat is given up to the coil 18 to heat the incoming coal slurry. The rate at which the gas travels up the main condenser column 19 is determined by the pressure in the container 28 which in turn can be adjusted by the operator using the pump-valve 26. The pressures in the secondary condenser stages 63, 64 and 65 may be controlled by the operator using the pumps 68 and 71. Higher pressure results in lower temperature required to liquefy the volatile gas components, thus requiring less energy for cooling needed in the liquification process.

While the foregoing specific example relates to the reformation of coal, any other organic or inorganic material may be used, which can be chemically reformed into other products by varying the temperature and the pressure.

As another example, instead of coal, soybeans may be used, and a lower pressure of less than about 100 psi (relative pressure) in the LTHP unit would be necessary because soybeans tend to absorb water until they are saturated. In the HTLP unit, the pressure can be adjusted to about 0 to 200 psi (relative) in order to control the molecular weight of the oil desired to be produced. The remainder of the system would be essentially as described previously with respect to coal.

When processing coal, the process liquid may be plain water or a solution of water plus calcium carbonate, sodium or calcium hydroxide. For organic material other than coal, one may use acid hydrolysis utilizing carbonic acid plus water. The processor may also be used to convert HDPE plastic to oil or a 50% mass to mass mixture of plastic and coal may be run in oil of five barrels per ton of coal processed.

It should be apparent from the foregoing that a novel and improved processor, which may be referred to as a thermal depolymerization processor (TDP), has been provided. The processor may be operated to convert a variety of materials into useful and valuable products. For example, products such as garbage, leaves and grass which otherwise would create environmental problems may be converted to useful products, thereby avoiding the need for landfills and incinerators. The processor may be built in various sizes such as a small unit for a single family home to a large unit for use by a municipality or a large hospital.

While a gas heater has been disclosed for heating the process materials, it will be apparent that other heat sources may be utilized. The valves, pumps, etc. may be operate by hand or by a computerized automatic control.

What is claimed is:
1. A process for converting a process material into other useful products, comprising the steps of:

mixing the process material with a process liquid to create a flowable emulsion, pumping said emulsion to an expansion container while preheating said emulsion with a least one heated fluid from the process, further quickly reducing the pressure on said emulsion while quickly heating said emulsion with a heating source to separate volatile in said emulsion, collecting said separated volatile, and collecting said separated solids.

2. A process as set forth in claim 1, including the step of increasing said pressure on said separated volatiles while cooling said separated volatiles to produce separate components.

3. A thermal depolymerization processor for converting a process material into other use products comprising:
   a) a mixer means for mixing the process material with a process liquid and for forming a flowable slurry;
   b) a first system means connected to said mixer means for receiving, heating and increasing the pressure applied to said slurry;
   c) a second system means connected to said first system means for receiving and quickly reducing said pressure applied to said slurry and for quickly heating and reforming said slurry into a first by-product and a second by-product;
   d) a first collection means for receiving said first by-product from said second system means; and,
   e) a second collection means for receiving said second by-product from said second system means.

4. The thermal depolymerization processor of claim 2 including a grinder means connected to said mixer means for grinding the process material.

5. The thermal depolymerization process of claim 2 wherein said second collection means includes:
   a) a third system means connected to said second system means for receiving, cooling and increasing said pressure applied to said second by-product, and for separating said second by-product into a third by-product and a fourth by-product; and,
   b) a third collection means for receiving said fourth by-product from said third system means.

6. The thermal depolymerization processor of claim 5 wherein said third collection means includes:
   a) a fourth system means connected to said third system means for receiving and separating said third by-product into a fifth by-product and a sixth by-product;
   b) a fourth collection means for receiving said fifth by-product from said fourth system means; and,
   c) a fifth collection means for receiving said sixth by-product from said fourth system means.

7. A thermal depolymerization processor for converting a process material into other useful products comprising:
   a) a mixer adapted for mixing the process material with a process liquid and for forming a flowable slurry;
   b) a conduit connected at one end to said mixer having at a first end a pump and at a second end a valve therein adapted for receiving, heating and increasing the pressure applied to said slurry;
   c) an expansion container connected to second end of said conduit adapted for receiving and quickly reducing said pressure applied to said slurry having heating means for quickly heating and reforming said slurry into a first by-product and a second by-product;
   d) a first collection means for receiving said first by-product from said expansion container; and,
   e) a second collection means for receiving said second by-product from said expansion container.

8. The thermal depolymerization processor of claim 7 including a grinder connected to said mixer adapted for grinding the processor material.

9. The thermal depolymerization processor of claim 7 wherein said second collection means includes:
   a) a primary condenser connected to said expansion container adapted for receiving, said cooling and increasing said pressure applied to said second by-product and for separating said second by-product into a third by-product and a fourth by-product; and,
   b) a third collection means for receiving said fourth by-product from said primary condenser.

10. The thermal depolymerization processor of claim 9 including:
   a) a secondary condenser connected to said primary condenser adapted for receiving and increasing said pressure applied to said third by-product and for cooling and separating said third by-product into a fifth by-product and a sixth by-product; and,
   b) a fourth collection means for collecting said sixth by-product from said secondary condenser.

11. A thermal depolymerization processor for converting a process material into other useful products comprising:
   a) a grinder adapted for grinding the process material;
   b) a mixer adapted for receiving and mixing the process material with a process liquid to form a flowable slurry;
   c) a first conduit connected at one end to said mixer having at a first end a pump and at a second end a valve therein adapted for receiving, heating and increasing the pressure applied to said slurry;
   d) an expansion container connected to said second end of said first conduit adapted for receiving and quickly reducing said pressure applied to said slurry and for quickly heating and reforming said slurry into a solid by-product and a first gas by-product;
   e) a primary condenser connected to said expansion container adapted for receiving, cooling and increasing said pressure applied to said first gas by-product and for separating said first gas by-product into both a second gas by-product and a liquid by-product;
   f) a second conduit adapted for connecting said expansion container to said primary condenser and transporting said first gas by-product to said primary condenser;
   g) a secondary condenser connected to said primary condenser adapted for receiving and increasing said pressure applied to said second gas by-product and for cooling and separating said second gas by-product into a third gas by-product and a fourth gas by-product;
   h) a first collection means for receiving and collecting said solid by-product from said expansion container;
   i) a second collection means for receiving and collecting said liquid by-product from said primary condenser;

j) a third collection means for receiving and collecting said third gas by-product from said secondary condenser; and k) a fourth collection means for receiving and collecting said fourth gas from said secondary condenser.

12. The thermal depolymerization processor of claim 11 wherein a) said expansion container is heated by a burner assembly, the gas supplied to said burner assembly being one of said gas by-products, and b) said first conduit is heated by heat emanating from said expansion container and said primary condenser.

* * * * *

UNITED STATES PATENT AND TRADEMARK OFFICE
CERTIFICATE OF CORRECTION

PATENT NO.   : 5,269,947
DATED        : December 14, 1993
INVENTOR(S)  : Paul T. Baskis It is certified that error appears in the above-indentified patent and that said Letters Patent is hereby corrected as shown below:

Column 2, line 47, "36" should be --26--.

Column 3, line 23, "5" should be --52--.

Column 4, line 47, after the word "run," the phrase --to produce coke and oil. This produces an increase-- should be inserted.

Column 5, line 33, "2" should be --3--.

Column 5, line 36, "2" should be --3--.

Column 7, line 3, after the word "and," there should be a comma, --,--.

Signed and Sealed this

Seventh Day of June, 1994

BRUCE LEHMAN

Attest:

Attesting Officer

Commissioner of Patents and Trademarks